Oct. 19, 1943.                    H. WEPPLO                     2,332,417
                                 TOOL HOLDER
                             Filed Feb. 5, 1942
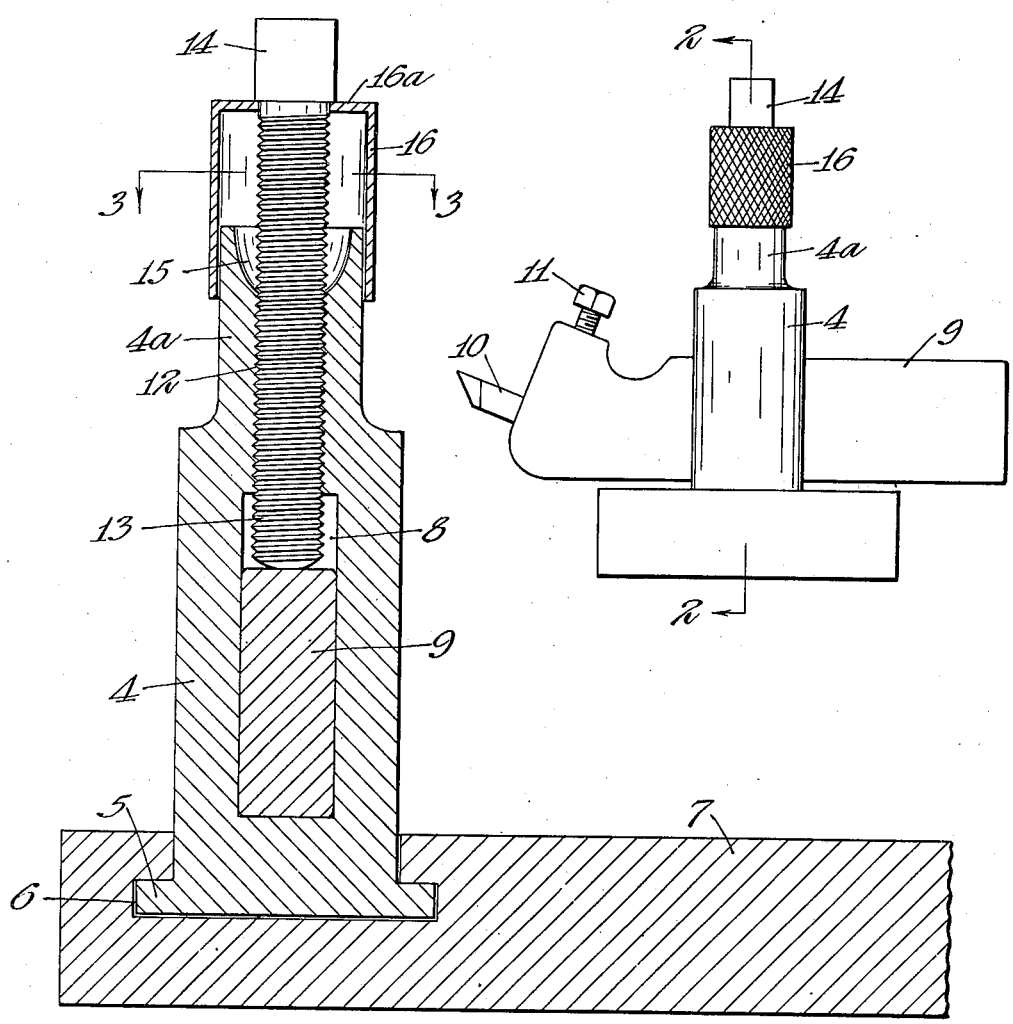
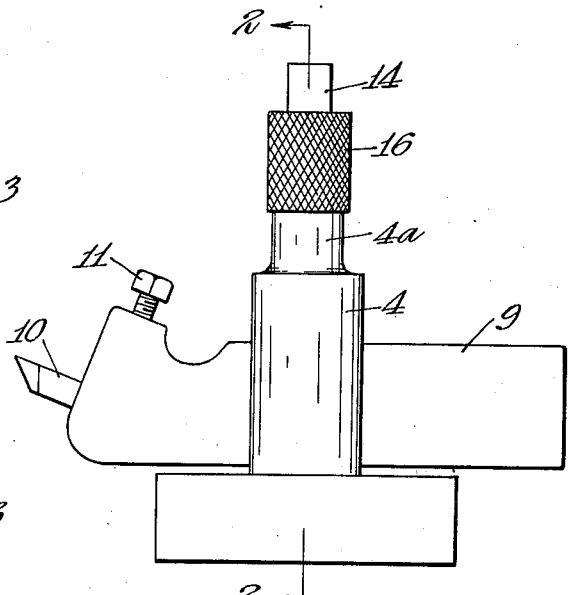
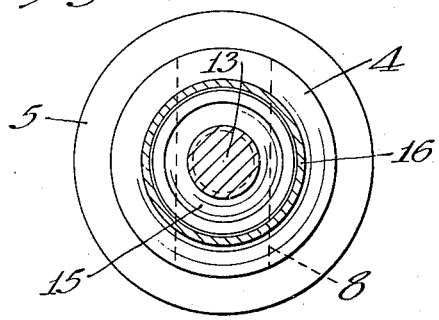
Inventor
Henry Wepplo
By Williamson & Williamson
Attorneys Patented Oct. 19, 1943

2,332,417

UNITED STATES PATENT OFFICE 2,332,417

TOOLHOLDER

Henry Wepplo, Minneapolis, Minn.

Application February 5, 1942, Serial No. 429,594

3 Claims. (Cl. 82—37)

This invention relates to tool holders and is particularly adaptable for use in connection with holding tools on lathes and similar machines where shavings and chips and the like are produced in operating on the work.

In metal working machinery such as lathes it is customary to provide tool holders which include threaded bolts for clamping the tools in proper cutting position. However, it frequently happens that chips and shavings get into the threads of the tool clamping bolt into which it is screwed with the result that the screw becomes jammed and the threads are mutilated. Also the tool clamping bolt should be maintained properly lubricated so that it will work freely and the lubricant acts as a collector for dirt and particles of metal and facilitates the working of metal pieces in between the threads of the bolt and tool post.

It is an object of my invention, therefore, to provide a tool holder for lathes and the like wherein means is included for shielding the tool clamping bolt from shavings, dirt and other particles so that the threads of the bolt will not become jammed in the threads of the tool post which supports the bolt.

Another object of the invention is to provide means for efficiently lubricating tool clamp bolts and for shielding the lubricant from accidental mixture of particles and other foreign substances.

These and other objects and advantages of the invention will more fully appear from the following description made in connection with the accompanying drawing, wherein like reference characters refer to the same parts throughout the views, and, in which:

Fig. 1 is an elevation of a tool holder constructed in accordance with my invention;

Fig. 2 is an enlarged vertical section through the tool holder taken approximately on the line 2—2 of Fig. 1; and Fig. 3 is a section taken approximately on the line 3—3 of Fig. 2.

In the drawing there is shown a tool post 4 having a flange 5 at its bottom end which fits into a slot 6 formed in a bar 7. Tool post 4 is slidable in said slot 6 so that the post can be moved toward and away from the work. The post 4 is provided with a rectangular aperture 8 in which is removably positioned a tool shank 9 which supports a cutting tool 10 held by a set screw 11. Extending upwardly through the tool post 4 is a vertically disposed threaded bore 12 in which is screwed a tool clamping bolt 13. The bolt 13 is preferably of such a length that it extends downwardly into the aperture 8 which receives the tool shank 9 and also upwardly some distance above the upper end of the tool post 4. The upper end of the tool clamping screw 13 is provided with a squared end 14 so that a wrench can be applied thereto to tightly clamp the tool shank 9 in the tool post 4.

In order to provide adequate lubricant for the clamping bolt 13 I produce a lubricant reservoir 15 in the form of a cavity. As shown in Figs. 2 and 3, the reservoir lies entirely around the tool clamping bolt 13. A suitable lubricant can be placed in the reservoir 15 so that as the bolt 13 is screwed up or down the threads of the bolt 13 will be bathed by the lubricant in the reservoir 15.

As stated above frequent difficulty has been encountered by chips and shavings working into the threads of the clamping bolt 13 and the bore 12 in the tool post 14. The possibility of this is more great when a lubricant reservoir such as the reservoir 15 is used. In order to protect the threads on the bolt 13 and in the bore 12 I provide a cup-shaped or sleeve-like apron 16 whose closed end 16a is secured to and about the upper portion of the tool clamping bolt 13. The point of attachment of the protective apron 16 is preferably at the top of the threads on the bolt 12 and immediately below the squared wrench receiving portion 14 at the upper end of the bolt 13. The sleeve-like apron 16 can be attached in any suitable manner such as shrinking it on the bolt or it may be threaded on if desired.

It should be seen that the sleeve-like apron 16 relatively closely fits the upper portion of the tool post 4 which is rounded as at 4a, and it can be readily seen in Fig. 2 that there is no possibility of flying chips and shavings getting into the lubricant reservoir 15 or to otherwise contact the upper end of the tool post 4 or the upper threaded portion of the tool clamping bolt 13. This eliminates any possibility of foreign particles working in between the threads and jamming or damaging said clamping bolt 13 or the threads in the bore 12. The lubricant in the reservoir 15 is kept clean, and the reservoir is so arranged that said clamping bolt 13 is lubricated each time the bolt is moved up or down.

The outer surface of the sleeve-like protective apron 16 is knurled, as shown in Fig. 1, so that the clamping bolt 13 can be moved quickly and easily with the fingers after the bolt has been released from its tightly clamped engagement with the tool shank 9 or when the bolt is being turned down against the tool shank 9 and before any great resistance has been encountered.

It will, of course, be understood that various changes may be made in the form, details, arrangement and proportions of the various parts without departing from the scope of my invention.

What is claimed is:

1. In a tool holder, a post having a tool receiving portion, said post including a substantially cylindrical portion having a threaded bore therethrough concentric to the outer surface of said cylindrical portion, a tool engaging bolt threaded into said bore, said bolt having a portion extending into said tool receiving portion of said holder and having its opposite end extending upwardly from said post, and a sleeve-like apron secured to the upper end of said bolt and extending a substantial distance downwardly around said threaded bolt and around said substantially cylindricl post portion in closely spaced relation to the latter, said apron being of substantially greater diameter than said bolt and having a knurled outer surface.

2. The structure in claim 1, and said bolt having a wrench engaging portion disposed above said sleeve-like apron.

3. In a tool holder, a post having a substantially vertical threaded bore therethrough, a tool engaging bolt threaded into said bore and having an upper end extending from said post, the upper portion of said post having an oil reservoir formed therein about said bolt, and an apron secured to the upper end of said bolt and extending a substantial distance downwardly around said threaded bolt, reservoir and said post.

HENRY WEPPLO.